United States Patent [19]

Nishizaki et al.

[11] Patent Number: 4,603,079

[45] Date of Patent: Jul. 29, 1986

[54] OVERCOATED SHEET

[75] Inventors: Toshinobu Nishizaki, Numazu; Shuhei Shiraishi, Mishima; Toshiyuki Osawa, Tokyo, all of Japan

[73] Assignee: Ricoh Co., Ltd., Tokyo, Japan

[21] Appl. No.: 635,860

[22] Filed: Jul. 30, 1984

[30] Foreign Application Priority Data

Aug. 2, 1983 [JP] Japan ............................... 58-141763
Aug. 2, 1983 [JP] Japan ............................... 58-141764

[51] Int. Cl.[4] ...................... B32B 18/00; B32B 27/06; B32B 27/36

[52] U.S. Cl. .................................... 428/323; 428/340; 428/414; 428/424.2; 428/424.4; 428/424.8; 428/458; 428/460; 428/461; 428/462; 428/463; 428/480; 428/483; 428/511; 428/514; 428/518; 428/519; 428/520; 428/910

[58] Field of Search ............ 428/414, 480, 483, 424.2, 428/424.4, 424.8, 518–520, 323, 340, 458, 460, 461, 462, 643, 511, 514

[56] References Cited

U.S. PATENT DOCUMENTS

| | | | |
|---|---|---|---|
| 4,100,329 | 7/1978 | Neithardt, Jr. | 428/482 |
| 4,202,923 | 5/1980 | Thoese | 428/482 |

*Primary Examiner*—P. C. Ives
*Attorney, Agent, or Firm*—Flynn, Thiel, Boutell & Tanis

[57] ABSTRACT

The present invention provides an overcoated sheet which comprises forming, on at least one surface of a substrate, an overcoat layer consisting essentially of styrene/butylmethacrylate/unsaturated organic acid system copolymer, and is used as a transfer sheet for use in a plain-paper copier, a drafting film, a diazo second original film and the like.

14 Claims, No Drawings

OVERCOATED SHEET

BACKGROUND OF THE INVENTION

(a) Field of the Invention

The present invention relates to an overcoated sheet used as a transfer sheet for use in a plain-paper copier, a drafting film, a diazo second original film or the like.

(b) Description of the Prior Art

The overcoated film, which is used as a transfer sheet for use in a plain-paper copier, a drafting film, a diazo second original film or the like, is required to possess a writing ability with a pencil, a water-color ink or an oil-color ink or the like, an erasability (or amendability) of an ink or a toner with eraser or an amending liquid (solvent), an adhering property to a toner or the like. In relation to these properties, additionally, the overcoated film is required to have a sufficient hardness, solvent-resistance and the like so that the overcoat layer may not be damaged or dissolved during writing (especially with a hard pencil) or during amending, a thermal stability to such an extent that materials may not be modified or decompose at the time of thermofitting a toner, and the like.

As the overcoated sheet like this there has hitherto been known the one which comprises forming, on at least one side of a substrate such as paper, plastic film or the like, if needed, a matted layer consisting essentially of a binder such as a thermoplastic resin like an acrylic acid resin, a thermo-setting resin like an amino resin and so forth and a matting agent, and thereafter forming thereon an overcoat layer consisting essentially of a water soluble resin such as a high polymer electrolyte and/or PVA.

However, any one of the conventional overcoated sheets could not satisfy the aforesaid requisite performance wholly and simultaneously.

SUMMARY OF THE INVENTION

It is an object of the present invention to provide an overcoated sheet superior especially as a transfer sheet, which is capable of satisfying all the requisite properties such as the writing ability especially with a pencil and a water-color ink, a pencil-writing erasing property, an adhering property to a toner and hardness.

The overcoated sheet according to the present invention is characterized in that an overcoat layer is formed on at least one side face of the substrate, said overcoat layer consisting essentially of a styrene/butyl methacrylate/unsaturated organic acid containing copolymer.

In the case of the present invention, it is preferable to further provide a matted layer between the substrate and the overcoat layer.

The composition ratio of the styrene/butyl methacrylate/unsaturated organic acid containing copolymer used in the overcoat layer is not specifically limited but it is preferable that styrene/butyl methacrylate/unsaturated organic acid=about 1-3/about 1-3/about 1-3 (by weight). In case the styrene ratio is less than 1 the film strength deteriorates which leads to a tendency of causing deterioration of the writing ability with a pencil and the pencil-writing and erasing property. In case the styrene ratio is more than 3, on the other hand, there is brought about a tendency that the adhesive property to the overcoat layer or toner deteriorates. In case the butyl methacrylate ratio is less than 1 there is a tendency that the adhesive property to the toner deteriorates, while in case said ratio is more than 3 there is a tendency that the film strength deteriorates. Further, in case the organic acid ratio is less than 1 the receptivity to the water-colored ink, namely the writing ability with the water-colored ink deteriorates, and in case said ratio is more than 3 the water solubility increases, which leads to a tendency that the water colored ink is liable to blot on the sheet when amending with said ink.

As the unsaturated organic acids there can be enumerated an acrylic acid, an methacrylic acid, a maleic acid, a crotonic acid, an itaconic acid and the like. Among them, however, an acrylic acid or a methacrylic acid is more preferable, and may be used in the form of a water soluble or water insoluble metallic salt, in particular in the form of a water soluble metallic salt, an ammonium salt or a sulfonic acid salt an occasion demands. The aforesaid copolymer may concurrently use fine powders of matting agents such as silica, glass, clay, titanium oxide, starch, fused alumina and the like. The amounts of these matting agents used are preferably 20% or less of the weight of the overcoat layer.

As the matted layer there is used the one consisting essentially of a resinous binder and a matting agent. As the binder there may be enumerated a thermoplastic resin such as an acrylic resin, a polyester resin, a vinylidene chloride resin, a vinyl acetate resin, a vinylidene chloride resin, a styrene resin or copolymers thereof and a cross-linking type resin such as a melamine resin, an urea resin, a polyurethane resin, an epoxy resin, an alkyd resin and mixtures thereof. Among them, however, a curing-type polyurethane resin is preferable in the light of the solvent-resistance and the thermo-stability. Explaining in more detail, this polyurethane resin is the one obtained from the reaction of a polyol resin with isocyanate. The polyol resin referred to herein implies the resin having two or more of hydroxyl groups in one molecule, and concretely includes a polyethylene glycol, a polyester having a hydroxyl group on its each end, a polyether, an acrylic resin and the like. Commercially available products include Desmophen 800 and 1100, Nipporan 1004, 3023 and 121 and Exerol 100 produced by Nippon Polyurethane Kogyo K.K., Epicron 730 produced by Dai Nippon Ink Kagaku Kogyo K.K., Hitaroid 3008 and 3088 produced by Hitachi Kasei Kogyo K.K., and the like. Among them, the acrylic system polyol resin is especially preferable.

On the other hand, polyisocyanate implies a compound containing two or more isocyanate groups in one molecule, and concretely includes tolylenediisocyanate, diphenylmethane-4,4'-diisocyanate, triphenylmethane-p,p',p''-triisocyanate, 2,4-tolylenediisocyanate dimer, hexamethylene-1,4-diisocyanate, naphthalene-1,5-diisocyanate, dicyclohexamethane-4,4'-diisocyanate, polymethylene polyphenyl isocianate, a reaction product between 3 mol of tolylenediisocyanate and 1 mol of trimethylolpropane, or the like. As the commercially available products, there are known Desmodule T, M, R, T, H and 15 produced by Bayer Company, West Germany, Pyrene T and DDM produced by Du Pont Company, U.S.A., Milionate MT and MR, Colonate L, HL and 2030 produced by Nippon Polyurethane Kogyo K.K. and the like. Among these polyisocyanates, the aliphatic type ones are especially preferable because they are subject to little yellowing caused by ultraviolet ray. In this connection, it is to be noted that the ratio of the polyol resin to the polyisocyanate, which varies due to the kind of these components or the kind of a base film used, is preferably to be the OH/-NCO equivalent ratio of 1/0.5–1/5. In case an excess of the polyisocyanate is present, an unreacted polyisocyanate remains in the matted layer, which leads to the problem of stickiness, while in case the amount of the polyisocyanate is too little, the cross-linking is insufficient, thereby deteriorating the solvent-resistance of the matted layer. In case another resin is added to the polyurethane resin, the amount of the resin to be added is preferably 30 wt.% or less of the whole amount of resin in the matted layer.

As the matting agents for use in the matted layer there can be enumerated, as described above, fine powders of glass, silica, clay, titanium oxide, starch, fused alumina and the like. The average particle diameter of these fine powders is suitably 0.1–50μ, preferably in the range of 1–10μ. The ratio of the matting agent to the binder in the matted layer is preferably about 1/0.5–1/10 (by weight). In case this ratio is less than 1/20, the matting (uneven) degree of the surface of the matted layer is inferior, whereby the writing ability with a pencil and the erasing ability with an eraser is deteriorated, while in case said ratio is more than 1/0.5, the strength of the matted layer is lowered.

As the substrate there are used paper, plastic films (for instance such as polysulfone, polyphenylene oxide, polyester, polyacetate, polyimide, polycarbonate, cellulose ester, polyamide and the like), synthetic paper (the one obtained by surface-processing a plastic film-like paper), metal evaporation-deposited films. But, the plastic film is normally used for that purpose.

The overcoated sheet according to the present invention may be prepared by, if necessary, after coating at least one surface of the substrate with the aqueous or organic solvent dispersion containing the thermo-plastic resin or thermo-setting resin and the matting agent, drying the same, if needed, further thermo-setting the coated film thereby to form a matted layer with an attachment amount of about 15 g/m$^2$, coating at least one surface of the substrate or, if necessary, said matted layer with an aqueous or organic solvent solution or dispersion containing a styrene/butyl methylacrylate/unsaturated organic acid containing copolymer and drying to form an overcoat layer. The coated amount on the overcoat layer is preferably 3 g/m$^2$ or less when using a non-impregnating substrate and 5 g/m$^2$ or less when using an impregnating substrate, although some difference is caused depending upon the impregnating ability of the substrate used. If the coated amount is more than 3 g/m$^2$ in the former case or the coated amount is more than 5 g/m$^2$ in the latter case, it is feared that the writing ability with a pencil deteriorates.

The above constructed overcoated sheet according to the present invention can satisfy almost all the performance required for the overcoated sheet such as the writing ability with a pencil or a water-colored ink, the eliminating ability with an eraser or an amending liquid, the adhering property to the toner, hardness and the like.

The present invention will be explained with reference to Examples hereinafter. Part, % and ratio are all by weight.

DESCRIPTION OF THE PREFERRED EMBODIMENTS

Example 1

Melamine resin (Uban 60R produced by Mitsui Toatsu K.K.): 20 parts
Vinyl chloride-vinyl acetate copolymer (VAGH produced by UCC Co., U.S.A.): 10 parts
Thermo-setting type acrylic resin (Aromatex MT-748 produced by Mitsui Toatsu K.K.): 75 parts
Quartz glass powder (Crystalite FM-1 produced by Tatsumori K.K.): 45 parts
Silica powder (Cyloid 308 produced by Fuji Devison K.K.): 10 parts
Methyl cellosolve: 90 parts A matting liquid having the above composition was coated on both surfaces of a 75μ-thick biaxially oriented polyester film by means of a wire bar so that the dry-coated amount might be 10 g/m$^2$, same was heat-dried at 120° C. for 10 minutes, and further was cured at 150° C. for 5 minutes to thereby obtain a matted film. Next, both surfaces of this matted film were coated with an overcoat liquid having the under mentioned composition by means of a smoothing bar and same was dried at 100° C. for 1 minute to thereby form an overcoat layer with the coated amount of 1 g/m$^2$. Thus, an overcoated sheet was prepared.

Styrene/butylmethyacrylate/ammonium maleate (2/1/1) copolymer: 10 parts
Water: 80 parts
isopropyl alcohol: 10 parts

Example 2

By repeating the exact same procedure as Example 1 except that a liquid having the following composition was used as an overcoat liquid, there was prepared an overcoated sheet A:

Styrene/butylmethacrylate/Methacrylic acid (3/3/4) copolymer: 10 parts
Silica powder (average particle diameter 3μ): 1.5 parts
Water: 78.5 parts
isopropyl alcohol: 10 parts On the other hand, this overcoat liquid was likewise coated on both surfaces of an electrophotographic transfer paper (a plain paper of 65 g/m$^2$) and dried to prepare an overcoat layer whose coated amount is 2 g/m$^2$. Thus, there was obtained an overcoated sheet B.

The thus obtained overcoated sheets according to the present invention and the matted film (Comparative Example 1) lacking an overcoat layer according to the aforesaid Example were tested with reference to the adhesiveness to a toner, the writing ability with a pencil and a water-colored ink and the pencil-writing erasing property. The obtained results were as shown in the following table.

| | | Example 1 | Example 2 (Overcoated sheets A and B) | Comparative Example 1 |
|---|---|---|---|---|
| Adhesiveness to toner | | 5 | 5 | 3 |
| Writing ability | Pencil (including the case of amending) | 5 | 5 | 5 |
| | Water- | 5 | 5 | 2 |

-continued

| | Example 1 | Example 2 (Overcoated sheets A and B) | Comparative Example 1 |
|---|---|---|---|
| colored ink | | | |

The test method is as mentioned below.

Adhesiveness to toner:

A toner image is formed on the surface of a sample by means of a plain-paper copier. A cellophane tape is put on this image area and thereafter is stripped off to examine the presence and absence of stripped image. The sample where the image is not stripped at all is evaluated "5" and the sample where the whole image has been stripped off is evaluated "1" according to the five-stage evaluation method.

Writing ability:

(1) After writing with a pencil (4H), it is erased with an eraser. The sample where writing and erasing are done well is evaluated "5", and the sample where writing and erasing are both impossible is evaluated "1" according to the five-stage evaluation method.

(2) In case writing is done with a water-colored sign pen, the sample where writing is done well is evaluated "5" and the sample where writing is impossible is evaluated "1" according to the five-stage evaluation method.

Example 3

Acrylpolyol resin (Hitaroid 3008 produced by Hitachi Kasei K.K.): 63 parts

Polyisocyanate (Colonate HL produced by Nippon Polyurethane K.K): 22 parts

Vinyl chloride-vinyl acetate copolymer (VAGH produced by UCC Co., U.S.A.): 6 parts Silica powder (Cyloid 308 produced by Fuji Devision K.K.): 13 parts Ethyl acetate/toluene (mixing ratio 3/7) solvent: 70 parts A matting liquid having the above mentioned composition was coated on both surfaces of a 75μ-thick bioxial oriented polyester film so that the dry coated amount might be 9 g/m$^2$, same was heat-dried at 120° C. for 1 minute, and thereafter further cured at 150° C. for 5 minutes to thereby obtain a matted layer. Next, both matted layers were coated with an overcoat liquid having the following composition so that the dry coated amount might become 0.8 g/m$^2$ respectively, and same was dried at 100° C. for 1 minute to thereby form an overcoat layer. Thus, an overcoated sheet was prepared:

Styrene/butylmethacrylate/ammonium acrylate (compounding ratio 2/1/1) copolymer: 10 parts Water: 80 parts isopropyl alcohol: 10 parts

Example 4

By repeating the exactly same procedure as Example 3 except that an overcoat liquid having the undermentioned composition and the coated amount on the overcoat layer was made 1.2 g/m$^2$, there was prepared an overcoated sheet:

Styrene/butylmethacrylate/methacrylic acid (compounding ratio 3/3/4) copolymer: 10 parts Silica powder (Cyloid S-244 produced by Fuji Devison Co.): 1.5 parts Water: 70 parts Isopropanol: 8 parts

Comparative Example 2

An overcoated sheet was prepared by repeating the exact same procedure as Example 3 except that an overcoat liquid having the following composition was used:

Styrene/butylmethacrylate (compounding ratio 1/1) copolymer: 10 parts

Toluene: 70 parts

Ethyl cellosolve: 20 parts

Comparative Example 3

An overcoated sheet was prepared by repeating the exact same procedure as Example 3 except that an overcoat liquid having the following composition was used:

Styrene/sodium methacrylate (Compounding ratio 1/1) copolymer: 10 parts

Water: 70 parts

Isopropyl alcohol: 10 parts

Example 5

An overcoated sheet was prepared by repeating the exact same procedure as Example 3 except that a matting liquid having the following composition was used:

Melamine resin (Uban 60R produced by Mitsui Toatsu K.K.): 20 parts

Vinyl chloride-vinyl acetate copolymer (the same as Example 1): 10 parts

Acrylic resin (Aromatex MF 748 produced by Mitsui Toatsu K.K.): 75 parts

Quartz glass powder (Crystalite FM-1 produced by Tatsumori K.K.): 45 parts

Silica powder (Cyloid 308): 10 parts

Methyl cellosolve: 90 parts

Next, the overcoated sheets obtained according to Examples 3-5 and Comparative Examples 2-3 were tested with reference to the adhesiveness to a toner (image) upon thermo-fixing, the writing ability with a pencil or a water-colored ink, the pencil-writing and erasing property and the thermo-stability (a formalin smell emitted upon thermo-fixing). The obtained results were as shown in the following table.

| | | Example 3 | Example 4 | Comparative Example 2 | Comparative Example 3 | Example 5 |
|---|---|---|---|---|---|---|
| Adhesiveness to a toner | | 5 | 5 | 5 | 1 | 5 |
| Writing ability | With a pencil (including amendment) | 5 | 5 | 4 | 4 | 4 |
| | with a water-colored ink | 5 | 5 | 1 | 5 | 5 |
| Thermo-stability | | | | | | Δ |

The test method is explained as follows.

Adhesiveness to a toner:

The same as described above.

Writing ability:

The same as described above.

Thermo stability

Each sample was subjected to repeated copying treatment by means of a plain-paper copier to examine the presence of absence of a formalin smell. " " denotes the sample which does not give out a formalin smell, "Δ" denotes the sample which gives out a weak formalin smell and "X" denotes the sample which gives out a strong formaline smell. In case, evaluation is made according to the three-stage evaluation method.

As is apparent also from the above results, the overcoated sheets according to the present invention is superior especially in the adhesiveness to a toner as compared with the comparative overcoated sheets and can satisfy substantially all the characteristics required for the matted film such as the writing ability with a pencil and a water-colored ink, thermo-stability and the like.

What is claimed is:

1. An overcoated sheet comprising a sheet substrate and an overcoat layer formed on at least one surface of said substrate, which overcoat layer consists essentially of a styrene/butylmethacrylate/unsaturated organic acid-containing copolymer.

2. An overcoated sheet according to claim 1 wherein the weight ratio of styrene/butylmethacrylate/unsaturated organic acid in the copolymer is about 1–3/-about 1–3/about 1–3.

3. An overcoated sheet according to claim 1 wherein the unsaturated organic acid component in the copolymer is selected from the group consisting of acrylic acid, methacrylic acid, maleic acid, crotonic acid and itaconic acid.

4. An overcoated sheet according to claim 1 wherein the unsaturated organic acid is acrylic acid or methacrylic acid.

5. An overcoated sheet according to claim 1 wherein a matted layer consisting essentially of a resinous binder and a matting agent is further provided between the substrate and the overcoat layer.

6. An overcoated sheet according to claim 1 in which said substrate is selected from the group consisting of paper, plastic films, synthetic paper and metal films.

7. An overcoated sheet comprising: a plastic film substrate; a matted layer consisting essentially of a resinous binder and a matting agent, said matted layer being formed on at least one surface of said substrate; and an overcoat layer on said matted layer, said overcoat layer consisting essentially of a styrene/butyl-methacrylate/unsaturated organic acid-containing copolymer.

8. An overcoated sheet according to claim 7 wherein the binder is a thermoplastic resin selected from the group consisting of an acrylic resin, a polyester resin, a vinyl chloride resin, a vinyl acetate resin, a vinylidene chloride resin, a styrene resin and copolymers thereof, or a crosslinking-type resin selected from the group consisting of a melamine resin, a urea resin, an epoxy resin, an alkyd resin and mixture thereof.

9. An overcoated sheet according to claim 8 wherein the binder is a curing-type polyurethane resin.

10. An overcoated sheet according to claim 9 wherein the unsaturated organic acid in the copolymer is selected from the group consisting of acrylic acid, methacrylic acid, maleic acid, crotonic acid and itaconic acid.

11. An overcoated sheet according to claim 10 wherein the unsaturated organic acid is acrylic acid or methacrylic acid.

12. An overcoated sheet according to claim 7 wherein the weight ratio of the matting agent to the binder is about 1/0.5–1/20.

13. An overcoated sheet comprising a polyester film, a matted layer coating one surface of said film and an overcoat layer coating said matted layer, said matted layer consisting essentially of a mixture of a resinous binder and particles of a matting agent having a particle size in the range of 1 to 10 microns, said overcoat layer consisting essentially of a copolymer of styrene, butyl methacrylate and polymerizable unsaturated organic acid wherein the weight ratio of styrene/butyl methacrylate/unsaturated organic acid in said copolymer is 1–3/1–3/1–3, said unsaturated acid being selected from the group consisting of acrylic acid, methacrylic acid, maleic acid, crotonic acid, itaconic acid and salts thereof, the weight of said overcoat layer per unit area of said film being 5 $g/m^2$ or less.

14. An overcoated sheet in which said resinous binder comprises a cured polyurethane obtained by reacting a polyol resin with a polyisocyanate.

* * * * *